(12) United States Patent
Luerkens et al.

(10) Patent No.: US 9,880,598 B2
(45) Date of Patent: Jan. 30, 2018

(54) CASCADED POWER-OVER-ETHERNET SYSTEM

(75) Inventors: Peter Luerkens, Aachen (DE); Harald Josef Günther Radermacher, Aachen (DE); Maurice Herman Johan Draaijer, Ittervoort (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 800 days.

(21) Appl. No.: 13/700,957

(22) PCT Filed: May 30, 2011

(86) PCT No.: PCT/IB2011/052359
§ 371 (c)(1),
(2), (4) Date: Nov. 29, 2012

(87) PCT Pub. No.: WO2011/151773
PCT Pub. Date: Dec. 8, 2011

(65) Prior Publication Data
US 2013/0144448 A1 Jun. 6, 2013

(30) Foreign Application Priority Data
Jun. 4, 2010 (EP) .................................. 10164898

(51) Int. Cl.
*G06F 1/26* (2006.01)
*G06F 1/30* (2006.01)
(Continued)

(52) U.S. Cl.
CPC .............. *G06F 1/266* (2013.01); *G05B 11/01* (2013.01); *G06F 1/305* (2013.01); *G06F 1/3203* (2013.01);
(Continued)

(58) Field of Classification Search
CPC ... G05B 11/01; H04L 12/40045; H04L 12/10; H04L 12/413; H04L 12/12; Y02B 60/34;
(Continued)

(56) References Cited

U.S. PATENT DOCUMENTS 5,841,360 A 11/1998 Binder
7,152,168 B2 * 12/2006 Boynton ................. H04L 12/10
307/66
(Continued)

FOREIGN PATENT DOCUMENTS

| EP | 1942600 A1 | 7/2008 |
|---|---|---|
| EP | 2051437 A1 | 4/2009 |
| JP | 2006203730 A | 8/2006 |
| JP | 2007088809 A | 4/2007 |

*Primary Examiner* — Crystal J Barnes-Bullock
(74) *Attorney, Agent, or Firm* — Meenakshy Chakravorty

(57) ABSTRACT

A Power-over-Ethernet (PoE) device (200) for use in a PoE system is described. The PoE device (200) comprising a first PoE port (210) for connecting the device to an upstream PoE device or a central control unit, a second PoE port (220) for connecting the device to a downstream device or PoE device and a control unit (240) for controlling data (335) and/or power communication (400) between the first (210) and second (220) PoE port. The control unit (240) further comprises a first power input terminal (305) connected to the first PoE port (210) to receive electrical power (320) for powering the control unit (240).

12 Claims, 1 Drawing Sheet

(51) Int. Cl.
*G06F 1/32* (2006.01)
*H04L 12/10* (2006.01)
*H04L 12/12* (2006.01)
*H04L 12/40* (2006.01)
*H04L 12/413* (2006.01)
*G05B 11/01* (2006.01)

(52) U.S. Cl.
CPC .............. *H04L 12/10* (2013.01); *H04L 12/12* (2013.01); *H04L 12/40045* (2013.01); *H04L 12/413* (2013.01); *Y02B 60/34* (2013.01)

(58) Field of Classification Search
CPC . G06F 1/26; G06F 1/263; G06F 1/266; G06F 1/305; G06F 1/3203; Y10T 307/406; Y10T 307/307; Y10T 307/469; Y10T 307/625; Y10T 307/724
USPC .......................................................... 700/286
See application file for complete search history.

(56) References Cited

U.S. PATENT DOCUMENTS

| | | | | |
|---|---|---|---|---|
| 7,155,622 | B2* | 12/2006 | Mancey | H04L 12/10 713/310 |
| 7,511,388 | B2* | 3/2009 | Webb | G06F 1/305 307/31 |
| 7,773,354 | B2* | 8/2010 | Apfel | H04L 12/10 361/55 |
| 7,941,677 | B2* | 5/2011 | Penning | G06F 1/263 361/731 |
| 8,432,142 | B2* | 4/2013 | Vorenkamp | G06F 1/266 323/266 |
| 2005/0033997 | A1 | 2/2005 | Boynton | |
| 2007/0170909 | A1* | 7/2007 | Vorenkamp et al. | 324/76.11 |
| 2007/0288784 | A1 | 12/2007 | Koper et al. | |
| 2009/0112373 | A1 | 4/2009 | Feldman et al. | |
| 2010/0223480 | A1 | 9/2010 | Fratti et al. | |
| 2011/0219244 | A1* | 9/2011 | Wu et al. | 713/300 |

* cited by examiner

CASCADED POWER-OVER-ETHERNET SYSTEM

FIELD OF THE INVENTION

The invention relates to the field of Power-over-Ethernet Systems and more specifically to the powering of Power-over-Ethernet devices.

BACKGROUND OF THE INVENTION

Power-over-Ethernet (PoE) is a standard enabling the powering of devices requiring moderate power consumption by means of a standard Ethernet cable, e.g. a Cat5 or Cat5e type of cable. Typically, in a Power-over-Ethernet System, a number of devices are attached to one or more of such cables, whereby the devices are powered by the cable via PoE switches. Such PoE switch (or in general, a PoE device) is generally applied as a node in a star type network topology and serves to direct the network traffic between the different Ethernet branches of the network. Such a PoE switch equally provides electrical energy according to the PoE-standard to the connected devices. Such devices can e.g. include lighting applications for domestic or professional lighting or may be sensors or the like.

Such a set-up has been proven a practical method to provide electrical energy to a plurality of connected devices, up to a distance of 100 m. Such a system has also proven to be suited if the power of the connected devices is low, or the distance is short, and if the powered devices are supposed to operate in continuous running mode, e.g. routers, DSL modems, other switches, and the like.

At present, it becomes clear that also other devices than those for computer and network technology, e.g. light sources, could be favorably supplied with energy by this method. Such a configuration could e.g. comprise a number of detached PoE-devices or PoE-switches, whereby each device or switch powers a number of devices in its close proximity, e.g. light sources. Characteristics for such devices are a comparatively high power requirement, they are operated intermittently, and often do not need persistent network connection.

In order to provide power to the connected devices and in order to provide in its own power requirement (e.g. to power a control unit controlling the operating of the switch), the PoE switches are provided with an own PoE power supply locally such as a mains supply connection. In general, such a PoE switch acquires its power supply from the local PoE power supply, irrespective of whether or not a device that is connected to the switch is operated or requires power. As such, an important power consumption (also referred to as standby power) can be noticed when the PoE switch is not powering a connected device. In view of the fact that PoE Systems are typically used for comparatively low or moderate power applications, the standby power requirements of the PoE switches as generally applied may adversely affect the overall efficiency of the PoE system.

It has been proposed to mitigate the standby power by providing a dedicated low power supply for this purpose in the PoE switch, providing power to the switches own functions in case of no attached devices require a PoE-supply; this may however result in a noticeable increase of the cost price of the system.

SUMMARY OF THE INVENTION

It would be desirable to provide a PoE System that enables a more efficient powering of a PoE device applied in the system.

Accordingly, in an aspect of the invention, there is provided a Power-over-Ethernet (PoE) device for use in a PoE system, the PoE device comprising:
a first PoE port for connecting the device to an upstream PoE device or a central control unit;
a second PoE port for connecting the device to a downstream device or PoE device;
a control unit for controlling data and/or power communication between the first and second PoE port;
wherein the control unit comprises a first power input terminal connected to the first PoE port to receive electrical power for powering the control unit.

The PoE device according to the invention can e.g. be applied in a cascaded

PoE system whereby the device is operated as a node in e.g. a star-type network topology. In an embodiment, the PoE device is a PoE switch. The PoE device according to the invention has a first and second PoE port, i.e. a terminal for connecting an Ethernet cable such as a Cat5 or Cat5e cable. At such a terminal or port, devices or other PoE devices can be connected thereby enabling data and/or power to be transferred between the connected components. A PoE system applying such a PoE device can e.g. comprise a central server connected to the first terminal or port of the PoE device or a plurality of first Ethernet terminals of a plurality of PoE devices, whereby the second terminal or port of the device or devices is used for connecting to a device such as a lighting application. In general, the first PoE port of the PoE device is used for connecting the PoE device to components upstream of the device to be powered or controlled by the PoE device.

Within the meaning of the present document, an upstream connection is considered a connection away from the device, whereas a downstream connection is considered a connection towards the device or e.g. away from a central server.

In an embodiment, the PoE device according to the invention is provided with a plurality of second terminals enabling a plurality of devices to be connected to the PoE device, e.g. downstream of a central server connected at the first Ethernet terminal of the PoE device.

The PoE device according to the invention further comprises a control unit which controls the operation of the device, i.e. data and/or power communication between the first and second PoE port and/or between the PoE ports and the control unit. Such a control unit can e.g. comprise a microprocessor or the like and ensures that the appropriate connections between components upstream or downstream are made when required.

In accordance with the present invention, the control unit of the PoE device as applied is further arranged to be powered via the first PoE port. In order to realize this, a power input terminal of the control unit is connected to the first PoE port to receive electrical power for powering the control unit. As such, the PoE device according to the invention need not rely on a separate power supply for powering the device's control unit, rather, the power requirements for the control unit can be met using electrical power obtained via the first PoE port. The electrical power can be provided as a separate signal, separate from any data communication, or can be superimposed on a data signal, depending on the type or Ethernet connection that is used. As such, the electrical power or the power supply signal can e.g. be provided by a central server or PoE device arranged upstream. In case the power requirements of a device to be powered downstream of the device are comparatively low (e.g. sensors or the like), said device may equally be powered by the power supply signal. Therefore, in an embodiment, the first PoE port is further connected to the second PoE port for providing the electrical power or power supply signal to the second PoE port for powering a downstream device or e.g. a further PoE device.

In order to address moderate or comparatively high power requirements, it may be preferred to include a power supply in the PoE device. Therefore, in an embodiment, the PoE device according to the invention further comprising a power supply connected to the second PoE port for providing power to the downstream device and/or connected to a further power input terminal of the control unit for powering the control unit. In such an embodiment, various options or operating modes exist for powering the downstream device and/or the device control unit. The operating mode may e.g. be made dependent on the instantaneous power requirements of the downstream device. As such, the PoE device can e.g. operate in a first mode whereby the control unit (and optionally the downstream device) are powered by the electrical power obtained via the first PoE port or can operate in a second mode whereby the control unit (and optionally the downstream device) are powered by the power supply. As a result, the PoE device according to the embodiment may easily adapt to varying power requirements of a device to be powered. This enables to improve the overall system efficiency, in particular when devices are only operated intermittently. As an example of such devices, lighting applications can be mentioned. When such applications are turned off (or operated at low intensity), the PoE device can e.g. operate in the first mode whereby the control unit and lighting application are powered by the power supply signal as obtained via the first PoE. When operating in the first mode, the power supply can be disconnected thereby reducing the idle losses occurring in such a power supply when operating at comparatively low power levels. Note that the power supplies as generally applied include a mains connection and a power converter (e.g. including an (electronic) transformer and a rectifier) for converting the mains power supply to a suitable voltage level for powering the control unit. Once the lighting application is turned on, it will be more efficient to power the lighting application via the power supply rather than via the first PoE port, thereby reducing losses occurring over the Ethernet cable connected at the first PoE port.

As described above, various connections (e.g. connecting the first and second PoE or connecting the first PoE and the control unit, . . . ) can be applied in the PoE device according to the invention for either powering the control unit or a downstream device connected at the second PoE. Such connections can be selectively operated (either opened or closed) and should therefore not be considered as rigid, fixed connections but rather as controllable connections, e.g. controlled by the control unit or a central control unit. Which connection to open or close, can e.g. be determined based on an instantaneous power requirement of a device or devices to be powered. As such, the device's control unit or a central control unit can determine the operating mode of the device and control the various connections accordingly.

In an embodiment, the PoE device according to the invention is provided with one or more power splitters for separating an input signal (e.g. received at the first PoE) into a data signal and a power supply signal or for combining a data signal and a power supply signal into an output signal for the second PoE.

The PoE device according to the invention may e.g. be applied in a PoE system according to the invention, the PoE system comprising a central control unit and one or more PoE devices according to the invention, the central control unit having one or more output PoE ports connected to one or more first PoE ports of the PoE devices according to the invention. In such a system, the central control unit (e.g. a central server or a PoE device) can e.g. determine how the PoE devices are to be powered. As an example, the central control unit can receive an input signal representing the power requirements of devices connected downstream of the PoE device or devices of the system and, based on the signal, determine how the PoE devices are to be powered. If the power requirements of the devices are zero, the central server may even arrange to disconnect the PoE devices entirely.

The PoE system according to the invention can e.g. be applied in a lighting application whereby one or more lighting units (e.g. LED lighting units) are connected to resp. one or more second PoE ports of the one or more PoE devices of the PoE system.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
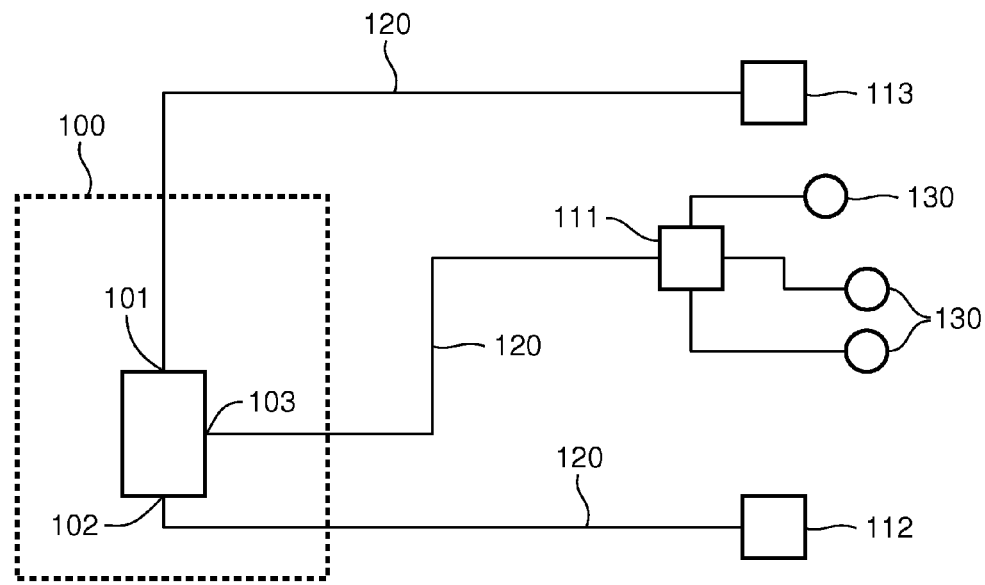
FIG. 1 schematically depicts a PoE system according to the present invention.

FIG. 1 depicts a PoE system according to an embodiment of the present invention. In the embodiment, a central control unit (e.g. a server or a PoE device provided with a power supply) is shown having three output PoE ports (101, 102 and 103) connected to PoE devices 111, 112 and 113, via Ethernet connections 120. The PoE devices 111, 112 and 113 can e.g. be located at various places in a building. The PoE devices 111, 112 and 113 are PoE devices according to the present invention, which are described in more detail below. In particular, the PoE devices can be PoE switches. The PoE switches (in general, the PoE devices) can e.g. be applied to power one or more devices 130 connected downstream of the PoE switches. Such devices can e.g. be other PoE devices or switches or may be sensors, controls, or other kind of equipment. The powering of the PoE devices 111, 112 and 113 and the devices 130 connected to the devices can be realized in various ways, due to the topology of the devices. As an example, the devices, in particular a control unit of the devices, can either be powered by a power supply signal received via the Ethernet connection 120 or may be powered from a local power supply (not shown) of the devices. Such a control unit (which can e.g. comprise a microprocessor or the like) may also be arranged to manage a power-up and power-down sequences of the device. This may e.g. be implemented in a software module, being a part of the operating software of the PoE devices. How the powering of the PoE devices is actually performed can either be controlled by the (local) control units of the PoE devices or can be controlled by the central control unit. In the latter case, the PoE devices and potentially even including intermediary switches can be powered down entirely when no power and functionality is required by the devices 130 connected to the switches. As such, the power-up or power-down sequences of the PoE devices may, in an embodiment, be managed by the central control unit. In such a PoE system, the following operating sequence may occur: After detecting that a connection to a PoE device is required, first this device is started up by the switching on the PoE-functionality of the relevant branch (i.e. the relevant Ethernet connection 120) by the central control unit. After the PoE device has established normal operation, any relevant data with respect to the required connection (e.g. under the form of network packets) and which may have been buffered meanwhile (e.g. in the central control unit), can be delivered to the PoE device. Based on the data received, it may now be decided, in a PoE device, if a connected PoE-device has to be powered up. If so, a power supply of the PoE switch is activated. Note that, depending on the power requirements, it may also be decided to power the device via the Ethernet connection rather than via the power supply. In case of a moderate or high power requirement, it may be decided to power the device from the (local) power supply. Optionally, also the power requirements of the control part of the PoE device (i.e. the control unit, not shown), can be taken from the local power supply, thus reducing potential power losses on the Ethernet cable 120 between the central control unit 100 and the PoE device.

If subsequently a device is deactivated, and it was the only one currently active, the PoE power supply of the PoE device can be deactivated again and power supply can be transferred to the central control unit. If it is detected (e.g. by a user input signal provided to the central control unit), that the PoE device does not anymore need a connection to the network either, then the entire PoE-device, including the device's control unit, can be powered down, and the PoE-power is removed from the cable 120. By the present invention, power consumption in intermittently running PoE based installations can be mitigated. It is particular useful for realizing efficient power distribution systems based on the PoE standard, for devices that are not typical computer network devices. The invention is thus particularly useful for realizing efficient, building wide lighting installations, based on the PoE standard.

Figure 2:
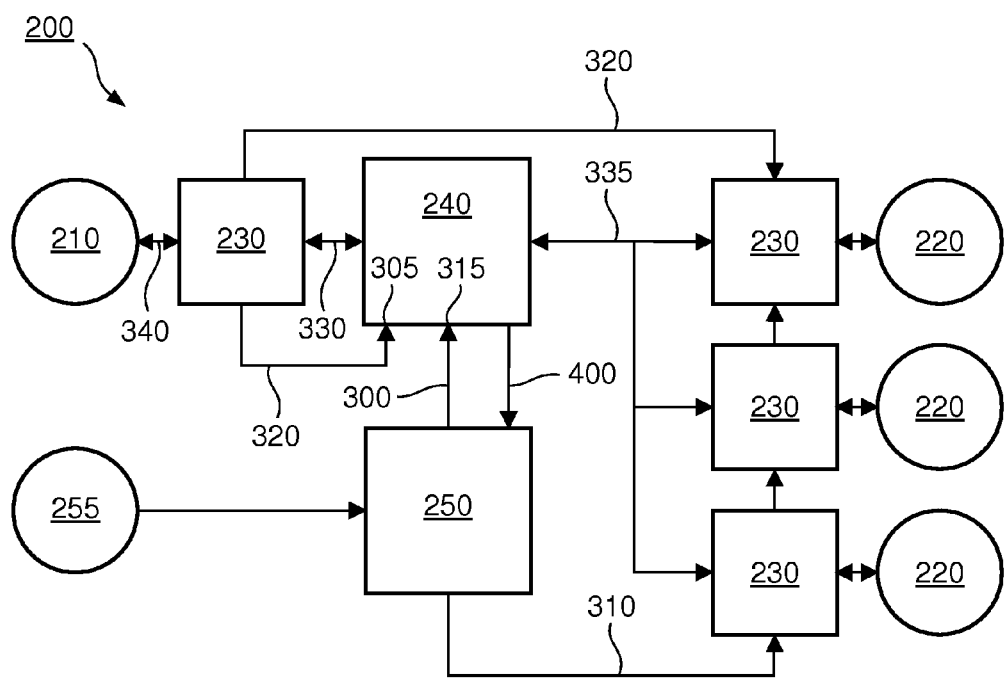
FIG. 2 schematically depicts an embodiment of a PoE device according to the present invention.

In FIG. 2, an embodiment of a PoE device, in particular a PoE switch according to the invention is schematically shown. The PoE switch 200 comprises a first PoE port 210 which can e.g. be used to connect (via an Ethernet cable, not shown) the PoE switch to an upstream central control unit or another PoE switch. The PoE switch further comprises three second PoE ports 220 which can be used to connect to downstream devices that are to be powered and/or controlled. Such devices can e.g. be sensors, routers, switches, lighting applications, etc. Each PoE port is, as shown, provided with a power splitter 230. Such a power splitter may be used for separating an input signal (e.g. received at the first PoE port 210) into a data signal and a power supply signal or for combining a data signal 335 and a power supply signal 320 into an output signal for the second PoE port 220. the power supply signal can e.g. be provide to a power input terminal 305 of the control unit and used for powering the control unit. The PoE switch 200 further comprises a control unit 240 for controlling the data and power communication between the first and second PoE ports and a local power supply 250 of the PoE switch. In the embodiment as shown, the local power supply 250 can be used to provide a supply power to the second PoE ports 220 (indicated by 300) and/or provide a supply power to the control unit (indicated by 310) at a power input terminal 315 of the control unit. The local power supply 250 may e.g. include a connection to a mains terminal 255. In case no power is required from the local power supply, the control unit 240 may disable the power supply by an appropriate control signal 400. In accordance with the present invention, the control unit 240 may also be powered by a power supply signal received via the first PoE port (indicated by the 320), via the power input terminal 305 of the control unit. In the embodiment as shown, a signal 340 received at the first PoE port is split into a data signal 330 and a power supply signal 320 which can be used to power the control unit of the PoE switch 200. Alternatively, or in addition, the power supply signal 320 may also be used to power any devices connected to the second PoE ports 220 by providing the power supply signal, via the power splitters connected at the second PoE ports, to the devices. Such a setup enables a flexible way of the both powering the control unit 240 and the devices connected to the second PoE ports. In an embodiment, the control unit controls via which connection the control unit or the devices are powered, e.g. based on the instantaneous power requirements. This enables the PoE switch to operate in an efficient manner, even for devices that are intermittently operated, such as lighting applications. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

A single processor or other unit may fulfill the functions of several items recited in the claims.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The invention claimed is:

1. A Power-over-Ethernet ("PoE") device, the PoE device comprising:
    a first PoE port for connecting the PoE device to a PoE upstream device or a central control unit;
    a second PoE port for connecting the PoE device to a downstream device;
    a PoE control unit for controlling data and/or power communication between the first and second PoE port, wherein the PoE control unit comprises a first power input terminal connected to the first PoE port to receive electrical power for powering the PoE control unit;
    a power supply connected to the second PoE port for providing power to the downstream device and/or connected to a second power input terminal of the PoE control unit for powering the PoE control unit, wherein the power supply is configured to provide power to the downstream device and the PoE control unit;

wherein a connection of the power supply to the second PoE port and/or a connection of the PoE control unit to the first PoE port are controlled by the PoE control unit;

wherein the PoE control unit is arranged to operate the PoE device in a first mode whereby the PoE control unit is powered via the first PoE port and in a second mode whereby the PoE control unit is powered by the power supply; and wherein the power supply is disabled by the PoE control unit when the PoE device is operating in the first mode.

2. The PoE device according to claim 1, wherein the first PoE port is connected to the second PoE port for providing the electrical power to the second PoE port for powering the downstream device of PoE device.

3. The PoE device according to claim 1, wherein the PoE device's operation in either the first or second mode is determined based on a power requirement of at least one of the PoE device or the downstream device.

4. The PoE device according to claim 3, wherein the PoE control unit is arranged to operate the PoE device in the first mode when the power requirement is below a predetermined threshold.

5. The PoE device according to claim 1, wherein the electrical power is provided as a power supply signal superimposed on a data signal.

6. The PoE device according to claim 5, further comprising a first power splitter connected to the first PoE port and the PoE control unit for separating the power supply signal from an input signal received at the first PoE port and providing the power supply signal to the first power input terminal.

7. The PoE device according to claim 5, further comprising a second power splitter connected to the second PoE port and the control unit for combining the power supply signal and a further data signal to an output signal for the second PoE port.

8. The PoE device according to claim 1, wherein the power supply is configured to provide power to the downstream device and the PoE control unit when said PoE control unit is operating said PoE device in said second mode.

9. The PoE device according to claim 1, wherein the PoE device's operation in either the first or second mode is determined based on a power requirement of the downstream device.

10. A PoE system for powering one or more devices, the system comprises:
 a central control unit having one or more output PoE ports;
 at least one PoE device having a first PoE port for connecting the PoE device to a PoE upstream device or a central control unit;
 a second PoE port for connecting the PoE device to a downstream device;
 a PoE control unit for controlling data and/or power communication between the first and second PoE port, wherein the PoE control unit comprises a first power input terminal connected to the first PoE port to receive electrical power for powering the PoE control unit;
 a power supply connected to the second PoE port for providing power to the downstream device and/or connected to a second power input terminal of the PoE control unit for powering the PoE control unit, wherein the power supply is configured to provide power to the downstream device and the PoE control unit,
 wherein a connection of the power supply to the second PoE port and/or a connection of the PoE control unit to the first PoE port are controlled by the PoE control unit;
 wherein the PoE control unit is arranged to operate the PoE device in a first mode whereby the PoE control unit is powered via the first PoE port and in a second mode whereby the PoE control unit is powered by the power supply;
 wherein the power supply is disabled by the PoE control unit when the PoE device is operating in the first mode; and
 whereby at least one of the one or more output PoE ports of the central control unit is connected to the first PoE port of the at least one PoE device.

11. The PoE system according to claim 10, wherein the central control unit is a server or another PoE device.

12. The PoE system according to claim 10, further comprising at least one lighting unit, wherein the lighting unit is connected to the second PoE port of the at least one PoE device.

* * * * *